United States Patent
Song et al.

(10) Patent No.: US 9,228,105 B2
(45) Date of Patent: Jan. 5, 2016

(54) AQUEOUS OVERCOAT ON SOLID INK JET PRINTS AND METHODS OF PRODUCING THE SAME

(75) Inventors: Guiqin Song, Milton (CA); Gordon Sisler, St. Catharines (CA); Nan-Xing Hu, Oakville (CA); Linn C. Hoover, Webster, NY (US); George A. Gibson, Fairport, NY (US)

(73) Assignee: XEROX CORPORATION, Norwalk, CT (US)

( * ) Notice: Subject to any disclaimer, the term of this patent is extended or adjusted under 35 U.S.C. 154(b) by 610 days.

(21) Appl. No.: 13/494,892

(22) Filed: Jun. 12, 2012

(65) Prior Publication Data

US 2013/0330526 A1   Dec. 12, 2013

(51) Int. Cl.
| | |
|---|---|
| *B32B 27/30* | (2006.01) |
| *B32B 27/32* | (2006.01) |
| *B32B 29/00* | (2006.01) |
| *B32B 33/00* | (2006.01) |
| *C08L 91/06* | (2006.01) |
| *C09D 5/02* | (2006.01) |
| *C09D 7/12* | (2006.01) |
| *C09D 121/02* | (2006.01) |
| *C09D 191/06* | (2006.01) |

(52) U.S. Cl.
CPC .............. *C09D 121/02* (2013.01); *B32B 27/30* (2013.01); *B32B 27/302* (2013.01); *B32B 27/308* (2013.01); *B32B 27/32* (2013.01); *B32B 29/00* (2013.01); *B32B 33/00* (2013.01); *C09D 5/024* (2013.01); *C09D 7/1283* (2013.01); *C09D 191/06* (2013.01); *B32B 2250/03* (2013.01); *B32B 2255/12* (2013.01); *B32B 2255/26* (2013.01); *B32B 2255/28* (2013.01); *B32B 2270/00* (2013.01); *B32B 2333/00* (2013.01); *B32B 2333/08* (2013.01); *B32B 2333/12* (2013.01); *B32B 2451/00* (2013.01); *B32B 2590/00* (2013.01); *B32B 2607/02* (2013.01); *C08L 91/06* (2013.01); *Y10T 428/24884* (2015.01)

(58) Field of Classification Search
CPC .... B32B 27/30; B32B 27/302; B32B 27/308; B32B 27/32; B32B 29/00; B32B 33/00; B32B 2250/03; B32B 2255/12; B32B 2255/26; B32B 2255/28; B32B 2270/00; B32B 2333/00; B32B 2333/08; B32B 2333/12; B32B 2451/00; B32B 2590/00; B32B 2607/02; C09D 121/02; C09D 191/06; C09D 5/024; C09D 7/1283; C08L 91/06; Y10T 428/24884
See application file for complete search history.

(56) References Cited

U.S. PATENT DOCUMENTS

| | | |
|---|---|---|
| 4,243,694 A | 1/1981 | Mansukhani |
| 4,251,824 A | 2/1981 | Hara et al. |
| 4,410,899 A | 10/1983 | Haruta et al. |
| 4,412,224 A | 10/1983 | Sugitani |
| 4,490,731 A | 12/1984 | Vaught |
| 4,532,530 A | 7/1985 | Hawkins |
| 4,601,777 A | 7/1986 | Hawkins et al. |
| 4,911,830 A | 3/1990 | Bromley et al. |
| 5,006,170 A | 4/1991 | Schwarz et al. |
| 5,122,187 A | 6/1992 | Schwarz et al. |
| 5,554,480 A | 9/1996 | Patel et al. |
| 7,576,149 B2 | 8/2009 | Anderson et al. |

OTHER PUBLICATIONS

Coatings and Adhesives Corporation, Technical Data Sheet for 1407, Feb. 25, 2009, pp. 1-3.
BASF Corporation, "Resins and Performance Additives for Printing and Packaging Industries", PP Selection Guide v.5.0, Sep. 9, 2011, pp. 1-24.

*Primary Examiner* — Patrick Niland
(74) *Attorney, Agent, or Firm* — MH2 Technology Law Group LLP

(57) ABSTRACT

A process for preparing a coated image and a recording medium with a coated image thereon. The coated image includes a solid ink image prepared with solid ink and an overcoat that at least partially covers the solid ink image. An aqueous overcoat composition for application to a solid ink image containing at least one latex emulsion, at least one polymer wax or wax emulsion, and at least one co-binder.

8 Claims, 4 Drawing Sheets

AQUEOUS OVERCOAT ON SOLID INK JET PRINTS AND METHODS OF PRODUCING THE SAME

BACKGROUND

Embodiments herein generally relate to solid ink jet printing. More specifically, certain embodiments relate to the overcoating of images prepared by printing on a substrate with a solid ink.

Prints generated by solid ink jet printers are known to rub off and scratch due to poor bonding between the ink and substrate. This characteristic of solid ink jet prints can result in unsatisfactory prints and customer complaints. For example, in the packaging industry, images printed on packaging (e.g., corrugated substrates) using solid ink can be damaged and the ink can be transferred to other packages and cause contamination.

Compared to toner prints, there is very little pressure applied to ink during the solid ink jet printing process (in both transfix and direct to paper configurations). Due to the relatively low pressure applied during solid ink jet printing, diffusion of ink into the substrate is reduced and the resulting images can be sharper/crisper, as a result. However, in the final solid ink print image, the ink rests on top of the substrate and there is very little bonding between the ink and the substrate. In addition, the wax content of solid ink jet prints can be very high, resulting in an image that can remain soft after printing and can, thus, be easily damaged with only a small amount of force being applied to the print.

One approach to minimizing damage to printed images is to apply a coating over the image, thereby forming a protective barrier and increasing the robustness of the printed image. Aqueous overcoatings are known for improving surface properties (such as appearance, wear resistance and scratch resistance) of printed images on paper and plastic substrates, among others.

Providing a continuous dry film (overcoat) which has good adhesion to the surface of solid ink jet print images, as well as good scratch resistance, wear and fold properties would be beneficial, especially in the packaging industry. Further, it would be beneficial if such overcoats could also improve the aesthetic appeal of a solid ink image by increasing its gloss, among other aesthetic properties.

SUMMARY

Provided herein are aqueous overcoat formulations which can be used to address problems associated with scraping and wear of print images prepared with solid ink (e.g., solid ink jet prints). In certain embodiments these aqueous overcoat compositions can provide good adhesion of solid ink to a printing substrate (e.g., paper, and corrugated paperboard, among others). The continuous dry films (overcoats) formed using such aqueous overcoat compositions can, in some embodiments, improve the wear, scratch, and fold properties of printed materials to which they are applied. In some embodiments, the continuous dry films formed can also improve the aesthetic appeal of a print image by increasing its gloss, among other aesthetic properties.

Certain embodiments are drawn to solid ink prints comprising a solid ink image on a substrate; and an aqueous overcoat composition at least partially covering the solid ink image. The aqueous overcoat composition before drying can comprise at least one latex emulsion, at least one wax or wax emulsion, at least one co-binder, and, optionally, at least one surfactant.

Some embodiments are drawn to a recording medium (comprising a surface substrate) with a coated image thereon. The coated image includes a solid ink image prepared by printing a solid ink on a substrate (e.g., a solid ink jet print image) and an overcoat (continuous dry film/varnish composition) that at least partially covers the solid ink image. The overcoat is prepared by a method comprising applying an aqueous overcoat composition to at least a part of the solid ink image. The aqueous overcoat composition contains at least one latex emulsion, at least one polymer wax or wax emulsion, and at least one co-binder.

In certain embodiments, the recording medium or substrate can comprise uncoated paper or paperboard, coated paper or paperboard, synthetic paper or plastic films, among other mediums/substrates known in the art. The recording medium or substrate can comprise a corrugated paper material in some embodiments.

The latex emulsion can comprise polymer microparticles, an emulsifier and an aqueous medium in some embodiments, and in certain embodiments, the polymer microparticles can contain an acrylic polymer, a styrene/acrylic polymer, polyester, or a mixture of two or more thereof. In some embodiments, the aqueous overcoat composition can also contain at least one of an anti-foaming agent, a surfactant, and an amino alcohol (e.g., a primary amino alcohol, among others).

In some embodiments, an aqueous overcoat composition can be applied at a wet thickness of from about 1 µm to about 20 µm over at least part of a solid ink image and after the aqueous overcoat composition is dried to form an overcoat (dry continuous film) it can have a thickness of from about 0.5 µm to about 10 µm.

Certain embodiments are drawn to processes for preparing a coated image involving printing an image with a solid ink onto a substrate and applying an aqueous overcoat composition to at least part of the solid ink image. The processes for preparing a coated image can further comprise drying the applied aqueous overcoat composition. The aqueous overcoat composition can contain at least one latex emulsion, at least one wax or wax emulsion, at least one co-binder, and, optionally, at least one surfactant, in some embodiments.

Some embodiments are drawn to aqueous overcoat compositions comprising at least one latex emulsion, at least one wax or wax emulsion, at least one co-binder, and, optionally, at least one surfactant, wherein after application to a solid ink image and, optionally, drying, the produced overcoat is capable of increasing at least one of gloss, wear resistance, scratch resistance, and adhesion of the image.

DETAILED DESCRIPTION

Figure 1:
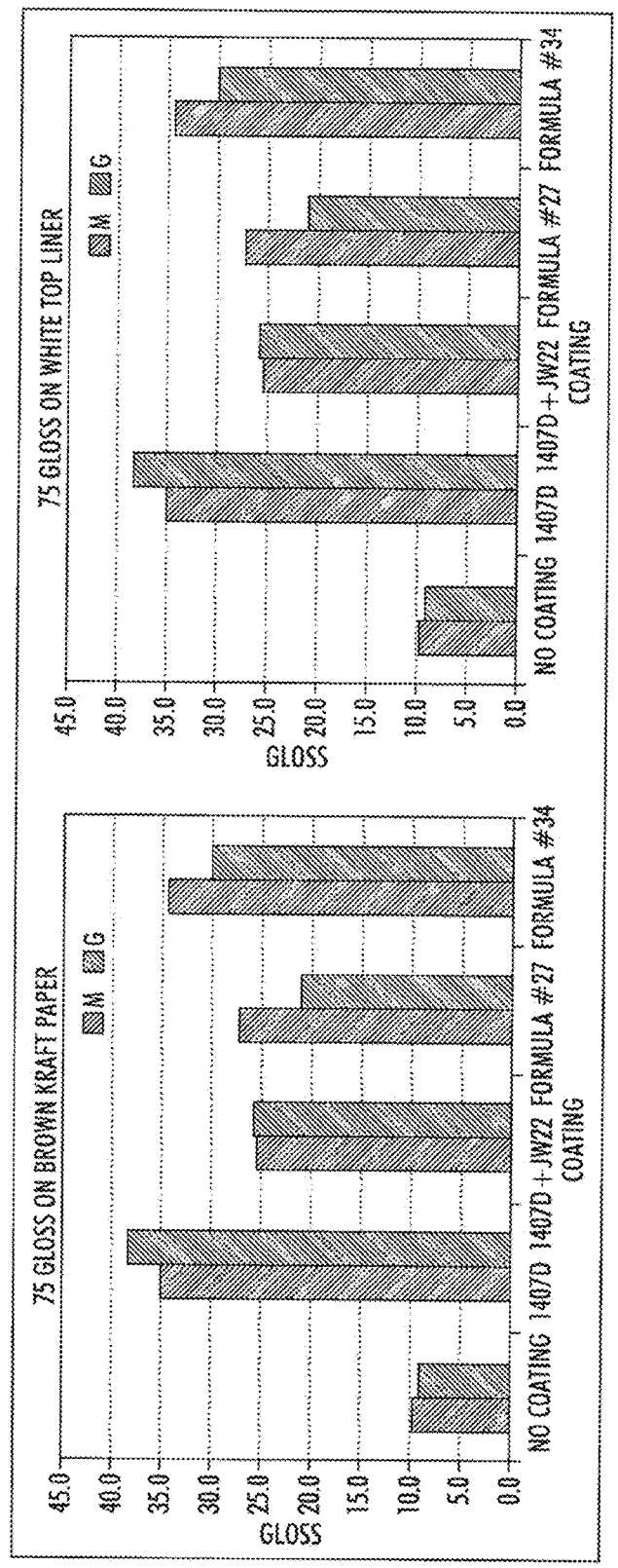
FIG. 1 compares the 75° gloss of solid ink jet prints on brown Kraft paper and white top liner paper. Shown are prints that have not been overcoated, and prints varnished with various overcoats including prints varnished using an aqueous overcoat composition of one embodiment.

Certain embodiments are drawn to processes for the preparation of a coated image. The processes comprise printing an image with a solid ink onto the surface of a substrate; and applying an aqueous overcoat composition to at least part of the printed image (between about 0.5% and about 100% of the image or at least about 50% of the image) on the substrate. The processes can further comprise drying the applied aqueous overcoat composition. The aqueous overcoat composition applied to the printed image on the substrate comprises at least one latex emulsion, at least one wax or wax emulsion, at least one co-binder, and, optionally, at least one surfactant.

The aqueous overcoat composition can be applied to at least partially cover a printed image (between about 0.5% and about 100%, between about 5% and about 100%, between about 50% and about 100%, between about 75% and about 100% of the image). In some embodiments, an aqueous overcoat composition is applied to essentially the entire printed image or the entire printed image.

Some embodiments are drawn to aqueous overcoat compositions comprising at least one latex emulsion, at least one wax or wax emulsion, at least one co-binder, and, optionally, at least one surfactant. Upon application to a solid ink image and, optionally, drying, aqueous overcoat compositions of the certain embodiments are capable of increasing at least one of gloss, wear resistance, scratch resistance, and adhesion of the solid ink image.

Certain embodiments are drawn to a recording medium (comprising a substrate) with a coated image thereon. The coated image comprises: (a) a solid ink image (such as, prepared by printing a solid ink) on a substrate and (b) an overcoat that at least partially covers the solid ink image. The overcoat can be prepared by a method comprising applying an aqueous overcoat composition to at least a part of the solid ink image. In certain embodiments, the aqueous overcoat composition comprises at least one latex emulsion, at least one polymer wax or wax emulsion, and at least one co-binder.

The aqueous overcoat composition can be applied to any type of substrate, such as, for example, paper, cardboard, etc. The aqueous overcoat composition can adhere to both coated and uncoated substrates, such as coated and uncoated paper. The substrate can contain additives including anti-curl compounds, such as, for example, trimethylolpropane, biocides, humectants, chelating agents, and mixtures thereof, and any other optional additives known in the art for enhancing the performance and/or value of the ink and/or the substrate.

In some embodiments, an image is printed on a substrate using solid ink. The recording medium or substrate can comprise a corrugated paper stock in some embodiments. In some embodiments, the recording medium can comprise uncoated paper or paperboard, coated paper or paperboard, synthetic paper or plastic films, among other substrates known in the art.

The aqueous overcoat composition can be applied to the substrate at any suitable time after image formation. For example, the aqueous overcoat composition can be applied to the substrate immediately after the image is formed, such as in an inline coating apparatus where the printing and overcoating are conducted by the same printing device, or after a short or long delay after printing, such as in an offline coating apparatus where the printing and overcoating are conducted by different printings devices.

Furthermore, the aqueous overcoat composition can be applied over the entire substrate, the entire image, parts of the substrate, or parts of the image. For example, the composition can be applied to both imaged areas and non-imaged areas or it can be applied only to imaged areas, and the like. In some embodiments, the aqueous overcoat composition can be applied over the entire substrate, including imaged and non-imaged areas, to provide enhanced image robustness. The aqueous overcoat composition can adhere well to both the substrate in non-imaged areas and to the ink of imaged areas on the substrate. The ink-based image on the substrate can have been previously prepared by any suitable printing process known in the art of ink jet printing devices.

Liquid film coating devices can be used for applying the aqueous overcoat composition, including roll coaters, rod coaters, blades, wire bars, air-knives, curtain coaters, slide coaters, doctor-knives, screen coaters, gravure coaters, such as, for example, offset gravure coaters, slot coaters, and extrusion coaters. Such devices can be used in a known manner, such as, for example, direct and reverse roll coating, offset gravure, curtain coating, lithographic coating, screen coating, and gravure coating. In some embodiments, coating of the aqueous overcoat composition is accomplished using a two or three roll coater.

An aqueous overcoat composition can be applied to a solid ink image at a wet thickness of from about 1 μm to about 20 μm, such as from about 2 μm to about 10 μm, from about 2 μm to about 8 μm or from about 3 μm to about 7 μm. After drying and hardening, the applied overcoat can have a thickness of from about 0.5 μm to about 10 μm, such as from about 0.5 μm to about 5 μm, from about 0.5 μm to about 4 μm or from about 1 μm to about 3 μm.

Ink jet printing processes can employ inks that are solid at room temperature and liquid at elevated temperatures. Such inks can be referred to as phase change inks or solid inks. Phase change inks suitable for use herein can include an ink vehicle that is solid at temperatures of about 20° C. to about 27° C., for example room temperature, and specifically are solid at temperatures below about 40° C. However, the inks change phase upon heating, and are in a molten state at jetting temperatures. Thus, the inks have a viscosity of from about 1 to about 20 centipoise (cP), such as from about 5 to about 15 cP or from about 8 to about 12 cP, at an elevated temperature suitable for ink jet printing, such as temperatures of from about 50° C. to about 150° C.

In this regard, the inks herein can be low energy inks. Low energy inks are solid at a temperature below about 40° C. and have a viscosity of from about 5 to about 15 cP at a jetting temperature of from about 50° C. to about 150° C., such as from about 70° C. to about 120° C. or from about 80° C. to about 120° C. The inks jet at lower temperatures than those discussed above and thus, require lower amounts of energy for jetting.

The ink image discussed herein can be formed from any such suitable phase change ink, for example, those inks disclosed in U.S. Pat. Nos. 4,490,731, 5,006,170 and 5,122,187, the disclosures of which are incorporated herein by reference in their entirety.

Phase change ink jet processes are well known and are described, for example, in U.S. Pat. Nos. 4,601,777, 4,251,824, 4,410,899, 4,412,224 and 4,532,530, the disclosures of which are incorporated herein by reference in their entirety.

The aqueous overcoat composition dries upon application to a substrate and/or on exposure to heat and/or air. Application of UV light is not necessary to dry some aqueous overcoat compositions of certain embodiments. However, a UV lamp can be used to dry the aqueous overcoat composition, for example when used as a heat source. Upon drying, the aqueous overcoat composition can also harden to form the overcoat.

In some embodiments, the aqueous overcoat composition dries more rapidly at slightly elevated temperatures, for example above 25° C. In certain embodiments, the aqueous overcoat composition dries at temperatures from about 25° C. to about 90° C., such as from about 25° C. to about 80° C. or from about 25° C. to about 60° C. The aqueous overcoat composition dries at temperatures less than the melting temperature of the ink. The overcoated substrate (with or without a solid ink image) can be placed on a belt that passes under a heat source having a temperature of from about 25° C. to about 70° C., such as from about 25° C. to about 65° C. or from about 25° C. to about 60° C., to effect drying. The speed at which the aqueous overcoat composition can be dried and hardened is from about 0 ft/min to about 100 ft/min, such as from about 10 ft/min to about 100 ft/min or from about 20 ft/min to about 100 ft/min. The aqueous overcoat composition can be dried and hardened under these conditions for about 0.5 second to about 20 seconds, such as for about 1 second to about 15 seconds or for about 1 second to about 10 seconds.

An aqueous overcoat composition comprises at least one latex emulsion, at least one polymer wax or wax emulsion, and at, least one co-binder. In some embodiments the aqueous overcoat composition comprises at least one of an anti-foaming agent, a surfactant, and an amino alcohol. Water, a co-dispersant (i.e., a primary amino alcohol, among others), and/or an anti-foaming agent can be introduced into the aqueous overcoat composition as a component of a co-binder or added to the aqueous overcoat composition directly. Water, a base, and/or an emulsifier/surfactant (i.e., propylene glycol, among others) can be introduced into certain aqueous overcoat compositions of certain embodiments as part of a latex emulsion or can be added to certain aqueous overcoat compositions directly.

An aqueous overcoat composition of certain embodiments can comprise: between about 45 wt % and about 90 wt % latex emulsion; between about 5 wt % and about 20 wt % polymer wax or wax emulsion; between about 5 wt % and about 20 wt % co-binder; and between about 0 wt % and about 5 wt % surfactant.

In some embodiments, further conventional optional additives that can be included in an aqueous overcoat composition are matting agents, pigments, UV absorbers, biocides, crosslinking agents, and the like. In certain embodiments, the aqueous overcoat composition can include optional additives known to those skilled in the art in an amount from about 0.1 wt % to about 10 wt %, such as from about 0.1 wt % to about 8 wt % or from about 1 wt % to about 10 wt %, of the aqueous overcoat composition.

In some embodiments, the aqueous overcoat composition can include water in an amount from about 30 wt % to about 80 wt %, such as from about 35 wt % to about 75 wt % or from about 40 wt % to about 60 wt %, of the aqueous overcoat composition.

In certain embodiments, an aqueous overcoat composition can comprise between about 0.01 wt % to about 5 wt % surfactant. In some embodiments an aqueous overcoat composition can comprise surfactants (including any surfactants present in the latex emulsion or added to the composition directly) in the range of about 1 wt % to about 5 wt %, such as from about 2 wt % to about 5 wt % or from about 3 wt % to about 4 wt %, of the aqueous overcoat composition. If two or more surfactants are utilized, each surfactant can be present in an amount from about 0.01 wt % to about 4.99 wt % of the aqueous overcoat composition, such as from about 0.1 wt % to about 4.9 wt % or from about 1 wt % to about 3 wt %, of the aqueous overcoat composition.

In some embodiments the aqueous overcoat composition can comprise an anionic surfactant, a nonionic surfactant, a silicone surfactant, a fluorosurfactant or a combination of two or more thereof. A commercially available surfactant that can be used in some embodiments is TRITON X100™ (Dow Chemical, Midland, Mich., USA).

Anionic surfactants, can include sulfosuccinates, disulfonates, phosphate esters, sulfates, sulfonates, and mixtures thereof.

Examples of nonionic surfactants include polyvinyl alcohol, polyacrylic acid, isopropyl alcohol, acetylenic diols, octyl phenol ethoxylate, branched secondary alcohol ethoxylates, perfluorobutane sulfonates and alcohol alkoxylates, among others.

Silicone surfactants are well known in the art and include polyether modified poly-dimethyl-siloxane and the like.

Examples of fluorosurfactants suitable for use herein include ZONYL® FSO-I00 (E.I. Du Pont de Nemours and Co., Wilmington, Del., USA), having the formula $R_fCH_2CH_2O(CH_2CH_2O)_xH$, wherein $R_f=F(CF_2CF_2)_y$, x=0 to about 15, and y=1 to about 7, FLUORADS® FC430, FC170C, FC171, and the like, available from 3M, ethoxylated nonyl phenol from Aldrich, and the like, and fluorosurfactants based on perfluorobutane sulfonates.

In some embodiments the aqueous overcoat composition can have a viscosity from about 50 cP to about 1000 cP, or from about 50 cP to about 750 cP, such as from about 100 cP to about 700 cP or from about 100 cP to about 650 cP, at room temperature (approximately 25° C.). The static surface tension of the aqueous overcoat composition can be from about 15 mN/m to about 40 mN/m, such as from about 20 mN/m to about 40 mN/m or from about 20 mN/m to about 30 mN/m.

Suitable anti-foaming agents that can be used in aqueous overcoat compositions of certain embodiments include silicon based defoamers. The aqueous overcoat composition can further include an anti-foaming agent, such as BYK®-019 and BYK®-028 (BYK Chemie GmbH), water based polysiloxane antifoaming agents, available from Dempsey Corp., DAPRO® DF900 (Elementis Specialties), FOAMASTER® S (Cognis), or the equivalent. The anti-foaming agent can be present in the aqueous overcoat composition in an amount from about 0 wt % to about 3 wt %, such as from about 0 wt % to about 2 wt % or from about 0.1 wt % to about 1 wt %, of the aqueous overcoat composition. SURFYNOL® DF-58 (Air Products and Chemicals, Inc., Allentown, Pa., USA) is an example of an anti-foaming agent that can be used in some embodiments.

In certain aqueous overcoat compositions of some embodiments, AMP-95™ (Dow Chemical, Midland, Mich., USA) can be employed as co-dispersant/primary amino alcohol.

The aqueous overcoat compositions disclosed herein can optionally include one or more rheological or viscosity modifiers. Examples of viscosity modifiers include alkali-swellable acrylic thickeners, such as ACRYSOL® ASE-60 (available from Rohm & Haas), ACRYSOL® ASE-75, RHEOLATE® 450 and RHEOLATE® 420, and associative thickeners, such as ELEMENTIS RHEOLATE® 255, RHEOLATE® 216 and RHEOLATE® 1. The aqueous overcoat composition can optionally include one or more viscosity modifiers in an amount from about 0.01 wt % to about 5.5 wt %, such as from about 0.01 wt % to about 5 wt % or from about 0.1 wt % to about 5 wt %, of the aqueous overcoat composition.

The aqueous overcoat composition can optionally include at least one coalescing aid. Suitable coalescing aids for use herein include polyglycol ethers, such as butyl carbitol and DOWANOL® DPnB (Dow Corp.), UCAR® Filmer IBT (Dow Corp.), DOWANOL® DPnP (Dow Corp.). When present, the coalescing aid can be present in the aqueous overcoat composition in an amount from 0 wt % to about 5 wt %, such as from about 0 wt % to about 4 wt % or from about 1 wt % to about 4 wt %, of the aqueous overcoat composition.

Matting agents can be used in aqueous overcoat compositions of some embodiments can include colloidal silicas, silica gels, aluminum silicates and waxes, and the like.

Dyes that are invisible to the naked eye but detectable when exposed to radiation outside the visible wavelength range (such as ultraviolet or infrared radiation), such as dansyl-lysine, N-(2-aminoethyl)-4-amino-3,6-disulfo-1,8-dinaphthalimide dipotassium salt, N-(2-aminopentyl)-4-amino-3,6-disulfo-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid, amide derivatives of 4,4'-diaminostilbene-2,2'-disulfonic acid, phenylurea derivatives of 4,4'-disubstituted stilbene-2,2'-disulfonic acid, mono- or di-naphthyltriazole derivatives of 4,4'-disubstituted stilbene disulfonic acid, derivatives of benzithiazole, derivatives of benzoxazole, derivatives of benzimidazole, derivatives of coumarin, derivatives of pyrazolines containing sulfonic acid groups, 4,4'-bis(triazin-2-ylamino)stilbene-2,2'-disulfonic acids, 2-(stilben-4-yl)naphthotriazoles, 2-(4-phenylstilben-4-yl)benzoxazoles, 4,4-bis(triazo-2-yl)stilbene-2,2'-disulfonic acids, 1,4-bis(styryl)biphenyls, 1,3-diphenyl-2-pyrazolines, bis(benzazol-z-yl) derivatives, 3-phenyl-7-(triazin-2-yl)coumarins, carbostyrils, naphthalimides, 3,7diaminodibenzothiophen-2,8-disulfonic acid-5,5-dioxide, other commercially available materials, such as C.I. Fluorescent Brightener No. 28 (CI 40622), the fluorescent series LEUCOPHOR B-302, BMB (CI. 290), BCR, BS, and the like (available from Leucophor), are also suitable for use as a colorant.

In addition, suitable colorants that can be used herein include one or more fluorescent colorants, which can be pigments, dyes, or a mixture of pigments and dyes. For example, suitable fluorescent pigment concentrates are disclosed in, for example, U.S. Pat. No. 4,911,830, the entire disclosure of which is incorporated herein by reference.

Suitable fluorescent colorants are disclosed in, for example, U.S. Pat. Nos. 4,243,694 and 5,554,480, the entire disclosures of which are incorporated herein by reference. Suitable inorganic fluorescent pigments can be prepared, for example, by adding trace amounts of activating agents such as copper, silver and manganese to high purity sulfides of heavy metals or alkaline earth metals such as zinc sulfide, which are used as raw materials, and calcining them at a high temperature. Suitable organic fluorescent pigments can be prepared, for example, by dissolving fluorescent dyes in the vehicles of synthetic resins or ones prepared by dyeing the dispersed matters affine resin particles obtained by emulsion polymerization or suspension polymerization with fluorescent dyes. The synthetic resins can include, but are not limited to, vinyl chloride resins, alkid resins and acrylic resins, and the fluorescent dyes include, but are not limited to, C.I. acid yellow 7, C.I. basic red 1 and the like.

Although not limited thereto, suitable fluorescent dyes include, but are not limited to, those belonging to the dye families known as rhodamines, fluoresceins, coumarins, napthalimides, benzoxanthenes, acridines, azos, and the like.

Suitable fluorescent dyes include, for example, Basic Yellow 40, Basic Red 1, Basic Violet 11, Basic Violet 10, Basic Violet 16, Acid Yellow 73, Acid Yellow 184, Acid Red 50, Acid Red 52, Solvent Yellow 44, Solvent Yellow 131, Solvent Yellow 85, Solvent Yellow 135, Solvent Yellow 43, Solvent Yellow 160 and Fluorescent Brightner 61. Suitable fluorescent pigments include, but are not limited to, those available from Day-Glo Color Corp. of Cleveland, Ohio, such as aurora pink T-11 and GT-11, neon red T-12, rocket red T-13 or GT-13, fire orange T-14 or GT-14N, blaze orange T-15 or GT-15N, arc yellow T-16, saturn yellow T-17N, corona magenta GT-21 and GT-17N, and the like.

UV absorbers can be included in the aqueous overcoat composition and can include benzophenone derivatives (such as SANDUVOR® 3041), hydroxyphenyltriazine (SANDUVOR® TB-O1), CIBAFAST® HLiq, CIBA TINUVIN® 1130 and TINUVIN® 5151.

Biocides can be incorporated into the aqueous overcoat composition and can include organosulfur, organohalogens, phenates, chlorophenates, heterocyclic nitrogen compounds, organic esters, quaternary ammonium compounds, inorganic boron compounds, and the like.

Crosslinking agents suitable fur use herein include thermosetting resins, such as CYMEL® 303, and oxalic acid.

Aqueous overcoat compositions of some embodiments comprise at least one latex emulsion. Aqueous overcoat compositions of certain embodiments can comprise between about 45 wt % and about 90 wt % of one or more latex emulsions. Some aqueous overcoat compositions can comprise about 66.7 wt % of at least one latex emulsion.

In some embodiments, the aqueous overcoat composition can include one or more latex emulsions in a total amount from about 40 wt % to about 95 wt %, such as from about 50 wt % to about 90 wt % or from about 60 wt % to about 90 wt %. If one or more latex emulsions is utilized, each latex emulsion can be present in an amount from about 1 wt % to about 94 wt % of the aqueous overcoat composition, such as from about 5 wt % to about 90 wt % or from about 10 wt % to about 85 wt % of the aqueous overcoat composition. Each latex emulsion can be present in any amount as long as the total amount of the latex emulsion in the aqueous overcoat composition is within the desired range and has the desired Tg.

A latex emulsion is a stable dispersion of polymer microparticles in an aqueous medium. In certain embodiments, the polymer microparticles of a latex emulsion comprise an acrylic polymer, a styrene/acrylic polymer, a polyester, or mixture of two or more thereof. In some embodiments, the polymer microparticles of a latex emulsion comprise an acrylic polymer. Examples of suitable acrylic latex emulsions include poly(alkyl methacrylate-alkyl acrylate), poly(alkyl methacrylate-aryl acrylate), poly(aryl methacrylate-alkyl acrylate), poly(alkyl methacrylate-acrylic acid), and poly(alkyl acrylate-acrylonitrile-acrylic acid). The latex can contain a resin such as poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(methyl methacrylate-isoprene), poly(ethyl methacrylate-isoprene), poly(propyl methacrylate-isoprene), poly(butyl methacrylate-isoprene), poly(methyl acrylate-isoprene), polyethyl acrylate-isoprene), poly(propyl acrylate-isoprene), poly(butyl acrylate-isoprene) and the like.

An example of a commercially available latex emulsion suitable for use in certain embodiments is the waterbased acrylic coating 1407D (Coatings & Adhesives, Corp., Leland, N.C., USA). 1407D comprises microparticles comprising acrylic polymer (~48 wt % solids), water (~46 wt %), ammonium hydroxide (~2-3 wt %), and propylene glycol (~5-6 wt %).

Examples of suitable styrene/acrylic latex emulsions include poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(styrene-alkyl acrylate-acrylonitrile-acrylic acid), and poly(styrene-1,3-diene-acrylonitrile-acrylic acid). The latex can contain a resin such as poly(styrene-butadiene), poly(methylstyrene-butadiene), poly(styrene-isoprene), poly(methylstyrene-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylononitrile-acrylic acid) and the like.

Examples of specific acrylic latex emulsions suitable for use herein include RHOPLEX® HA-12 and RHOPLEX® 1-2074 available from Rohm & Haas, Co. Examples of styrene/acrylic latex emulsions include JONCRYL 77, JONCRYL 74A, and JONCRYL HRC1661 from BASF. Water based acrylic or styrene/acrylic emulsions can be self-crosslinking and/or alkali soluble and supplied on the acid side (un-neutralized).

Examples of suitable polyester latex emulsions include polyethylene-terephthalate, polypropylene-terephthalate, polybutylene-terephthalate, polypentylene-terephthalate, polyhexalene-terephthalate, polyheptadene-terephthalate, polyoctalene-terephthalate, polyethylene-sebacate, polypropylene-sebacate, polybutylene-sebacate, polyethylene-adipate, polypropylene-adipate, polybutylene-adipate, polypentylene-adipate, polyhexalene-adipate, polyheptadene-adipate, polyoctalene-adipate, polyethylene-glutarate, polypropylene-glutarate, polybutylene-glutarate, polypentylene-glutarate, polyhexalene-glutarate, polyheptadene-glutarate, polyoctalene-glutarate polyethylene-pimelate, polypropylene-pimelate, polybutylene-pimelate, polypentylene-pimelate, polyhexalene-pimelate, polyheptadene-pimelate, poly(propoxylated bisphenol-fumarate), poly(propoxylated bisphenol-succinate), poly(propoxylated bisphenol adipate) and poly(propoxylated bisphenol-glutarate), In some embodiments, a latex emulsion comprises polymer microparticles, an emulsifier/surfactant (e.g., propylene glycol, among others) and an aqueous medium (i.e., water). A latex emulsion can further comprise at least one base in some embodiments. In some embodiments, a latex emulsion can comprise between about 1 wt % to about 5 wt % base. Examples of bases include an alkali base, ammonia, amino alcohols and the like. An aqueous overcoat composition of certain embodiments can comprise between about 1 wt % to about 5 wt %, such as from about 1 wt % to about 4 wt % or from about 1 wt % to about 3 wt % base. One exemplar of a base that can be used in certain aqueous overcoatings of some embodiments is ammonium hydroxide.

The latex emulsion used in aqueous overcoat compositions of certain embodiments can have a glass transition temperature ($T_g$) of, for example, from about 30° C. to about 95° C., such as from about 35° C. to about 85° C. or from about 35° C. to about 70° C. To achieve this range of $T_g$ more than one latex emulsion can be used. In other words, various latex emulsions can be combined to achieve the desired $T_g$ for the overall latex emulsion component of the aqueous overcoat composition.

For example, a latex emulsion having a $T_g$ higher than the desired final $T_g$ can be employed with additional latex emulsions having a lower $T_g$, or a latex emulsion having a $T_g$ lower than the desired $T_g$, such as from about 80° C. to about 30° C., or less. Any combination of one or more latex emulsions can be combined, as long as the desired $T_g$ range for the overall latex emulsion mixture is achieved. The $T_g$ can be measured by differential scanning calorimetry (DSC) using, for example, a DSC 2920 (obtained from TA Instruments) or dynamic mechanical analysis using, for example, a Rheometric Scientific RSAH Solid Analyzer. Aqueous overcoat compositions of some embodiments comprise at least one polymer wax or wax emulsion. Examples of waxes suitable for use herein include functionalized waxes, polypropylenes and polyethylenes, In certain embodiments, the aqueous overcoat composition comprises a polyethylene wax. A microcrystalline polymer, wax can be used in some embodiments. Suitable wax emulsions are available from BASF, Michaelman Inc., Daniels Products Company, Eastman Chemical Products, Inc. and Sanyo Kasei K.K.

Commercially available polyethylene waxes commonly possess a molecular weight of from about 1,000 to about 1,500, while the commercially available polypropylene waxes are believed to have a molecular weight of from about 4,000 to about 5,000. Examples of functionalized waxes include amines, amides, imides, esters, quaternary amines, carboxylic acids or acrylic polymer emulsions. Examples of polyethylene waxes include JONCYRL WAX 26 & 28 available from BASF, and chlorinated polypropylenes and polyethylenes commercially available from Allied Chemical, Petrolite Corporation and SC Johnson wax. For example, in some embodiments the aqueous overcoat composition can comprise the polyethylene wax JONCRYL® Wax 22 (BASF Corporation, Florham Park, N.J., USA).

An aqueous overcoat composition of certain embodiments can comprise between about 10 wt % and about 30 wt % polymer wax or wax emulsion. In certain embodiments, an aqueous over composition comprises between about 20 wt % and about 30 wt % polymer wax or wax emulsion; or at least about 25 wt % polymer wax or wax emulsion in some embodiments.

An aqueous overcoat composition of some embodiments comprises at least one co-binder. In certain embodiments the co-binder can be an acrylic resin or an acrylic polymer emulsion. The co-binder can comprise at least one resin, water, at least one anti-foaming agent and, optionally, at least one amino alcohol, in some embodiments. An aqueous overcoat composition of some embodiments can comprise between about 5 wt % and about 15 wt % co-binder; between about 5 wt % and about 10 wt % co-binder; or between about 8 wt % and about 8.5 wt % co-binder In some embodiments, the co-binder can comprise: between about 20 wt % and about 35 wt % resin (weight of resin to total weight of the co-binder); between about 50 wt % and about 70 wt % water (weight of water to total weight of the co-binder); between about 0.1 wt % and about 0.5 wt % anti-foaming agent (weight of anti-foaming agent to total weight of the co-binder); and, optionally, between about 10 wt % and 20 wt % amino alcohol (weight of amino alcohol to total weight of the co-binder).

In certain embodiments the aqueous overcoat composition can include at least one amino alcohol (which in some embodiments the amino alcohol can be introduced as a component of the co-binder or it can be added to the aqueous overcoat composition directly). An amino alcohol refers, for example, to a compound having amino group(s) associated with an alkyl alcohol or an aryl alcohol. For example, the alkyl alcohol can include from about 1 to about 36 carbon atoms, such as from about 1 to about 30 carbon atoms or from about 1 to about 15 carbon atoms. An alkyl alcohol can be linear, branched or cyclic and includes, for example, methanol, ethanol, propanol, isopropanol and the like. Aryl alcohols can include from about 6 to 36 carbon atoms, such as from about 6 to about 30 carbon atoms or from about 6 to about 15 carbon atoms. An aryl alcohol includes, for example, cyclobutyl, cyclopentyl, phenyl and the like. One or more amino groups refers to, for example, from about 1 to about 10 amino groups, such as from 1 to about 5 amino groups or from 1 to about 3 amino groups.

Examples of suitable amino alcohols for use herein include, 2-aminoethanol, 2-aminopropanol, 2-aminobutanol, 2-aminohexanol, 2-methyl-2-aminoethanol, 2-methyl-2-aminoethanol, 2-methyl-2-aminopropanol, 2-ethyl-2aminoethanol, 2-ethyl-2-aminopropanol, 1-amino-2-propanol, 1-amino-2-butanol, 1-amino-2-pentanol, 3-amino-2-butanol, 2-amino-1,3-propanediol, 2-amino-2-ethyl-1,3propanediol, 3-amino-1,2-propanediol and tris-(hydroxymethyl)-aminomethane, triisopropanolamine, 2-dimethylamino-2-methyl-1-propanol and similar substances.

An example of a commercially available co-binder that can be used in certain embodiments is JONCRYL® 693.

Certain embodiments are drawn to solid ink prints comprising: a solid ink image on a substrate; and a varnish composition at least partially covering the solid ink image, wherein the varnish composition (aqueous overcoat composition) before drying comprises at least one latex emulsion, at least one wax or wax emulsion, at least one co-binder and, optionally, at least one surfactant. The varnish composition/aqueous overcoat composition can be as described above.

In some embodiments the substrate can comprise uncoated paper or paperboard, coated paper or paperboard, synthetic paper or plastic films, among other substrates known in the art. The latex emulsion can comprise polymer microparticles, an emulsifier, an aqueous medium, and, optionally between about 1 wt % to about 5 wt % at least one base, and the polymer microparticles can comprise an acrylic polymer, a styrene/acrylic polymer, a polyester, or mixtures of two or more thereof. In some embodiments, before drying the varnish composition can comprise between about 45 wt % and about 90 wt % latex emulsion. Before drying the varnish composition can comprise at least one of an anti-foaming agent, a surfactant, and an amino alcohol in some embodiments. In certain embodiments, the varnish composition can comprise a polyethylene wax. Before drying, the varnish composition can comprise between about 5 wt % and about 20 wt % polymer wax or wax emulsion in some embodiments. In certain embodiments, before drying, the varnish composition can have a viscosity from about 50 cP to about 1000 cP, or about 50 cP to about 750 cP at approximately room temperature. In some embodiments, the varnish composition can be applied at a wet thickness of from about 1 µm to about 20 µm, and after the varnish composition is dried the overcoat formed can have a thickness of from about 0.5 µm to about 10 µm.

The following Examples further define and describe embodiments herein. Unless otherwise indicated, all parts and percentages are by weight.

EXAMPLES

Example 1

Preparation of Overcoat Compositions

An aqueous overcoat formulation #27 was prepared having a formulation as indicated in Table 1. Table 2 below details of the components of the co-binder, Joncryl 693 Solution used in the aqueous overcoat formulation #27. Upon application and drying aqueous overcoat formulation #27 showed good wear, scratch resistance, fold properties and high gloss.

TABLE 1

Aqueous Overcoat Composition formulation #27

| Component | Supplier | Loading (wt %) |
|---|---|---|
| 1407D | Coating & Adhesive Inc. | 66.7 |
| Jocryl Wax 22 | BASF | 25 |
| Joncryl 693 Solution* | BASF | 8.3 |
| TRITON X-100 Surfactant | Dow Chemical | 0.5 |

TABLE 2

Joncryl ® 693 Solution Components:

| Component | Supplier | Loading (wt %) |
|---|---|---|
| Joncryl 693 resin | BASF | 25 |
| AMP95 | Dow Chemical | 15 |
| Water | — | 59.8 |
| Surfynol DF-58 Deformer | Air Products | 0.2 |

The JONCRYL ® 693 solution was prepared as follows:
1: Hot water (130-150° F.), AMP-95 ™ and SURFYNOL ® DF-58 defoamer (anti-foaming agent) were added to a covered vessel fitted with highspeed dispersing agitator.
2: The mixture was agitated and JONCRYL ® 693 was added slowly to prevent formation of lumps or balls. Agitation was continued at medium speed until the components were totally dissolved.

The overcoat solution was made by adding 1407D solution, JONCRYL® 693 solution (Table 2), JONCRYL® wax 22 and TRITON X-100™ surfactant together and mixing at medium speed (500 RPM) for 30 minutes using a magnetic stirrer.

Example 2

Gloss Measurements

Solid ink jet prints were generated on two packaging papers: GP 33# Brown Kraft and GP 26# White Top Liner. A Xerox home made fixture was used with commercial available solid ink which is used on some of the XEROX COLORQUBE printers. The prints were generated at 600 DPI. An overcoat was made manually using a number #10 Mayer rod with a wire diameter of 0.010 inches. Then the wet coating was sent to the oven of a Mathis lab coater to dry one minute at 90° C. Around 6-7 microns dry film (overcoat) were obtained on top of the print's surface.

Gloss was measured using a BYK Gardner gloss meter with a 75 degree reflection angle. The prints' gloss was dramatically increased 10 ggu to 20 ggu on both 100% solid Magenta and 100% solid Green after coated with 4 different formulations including formulation #27. FIG. 1 shows the results of the 75° gloss testing of the solid ink jet prints on brown Kraft paper and white top liner paper. FIG. 1 depicts a print without an overcoat, prints varnished with 1407D, 1407D-JW22 and overcoat formulation #34 and overcoated prints prepared using an aqueous overcoat composition #27 of one embodiment.

Example 3

Rotary Table Wear Test

Figure 2:
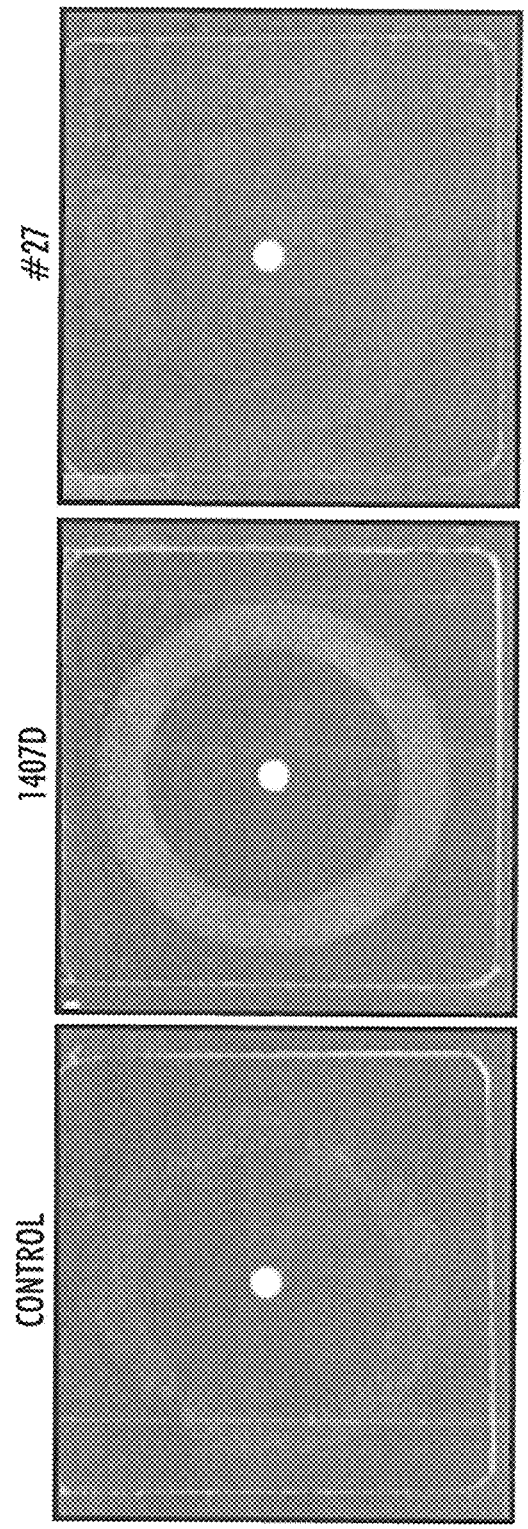
FIG. 2 depicts results of a rotary taber wear test comparing a recording medium that has not been overcoated, a recording medium overcoated with a commercially available overcoating composition, and a recording medium of one embodiment.

A TABER® Rotary Abraser was used for wear testing. Wheel CS-17 (which is coarse) was used for the testing. 500 gram weights were attached to the wheels. 80 abrasion cycles were run on the TABER® Rotary Abrader. FIG. 2 depicts results of a rotary taber wear test comparing a recording medium that was not overcoated, a recording medium overcoated with a commercially available 1407D overcoating composition and a recording medium of one embodiment.

Ink was worn off in the control, where there was no protective film (overcoat) on the surface of the solid ink print image. Even though there was no ink worn off with the 1407D overcoat (a commercially available coating from Coatings & Adhesives, Corp., Leland, N.C., USA), the wear track could clearly be seen on the print coated with 1407D. Overcoating A (falling within the scope of certain embodiments) provided the best results, among the three overcoatings tested. All of these tests were on the prints printed on Brown Kraft and White Top Liner.

Example 4

Three Finger Gouge Scratch Test

Figure 3:
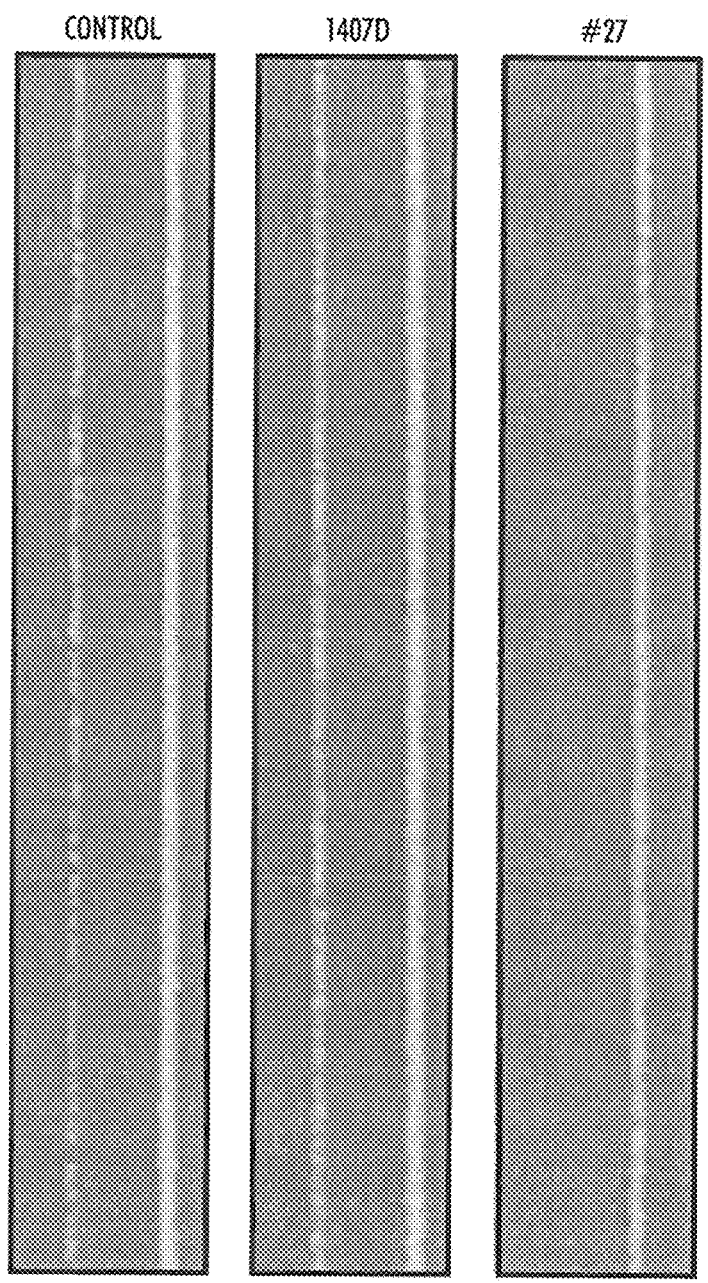
FIG. 3 depicts results of a three finger gouge scratch test comparing a recording medium that has not been overcoated, a recording medium overcoated with a commercially available overcoating composition and a recording medium of one embodiment.

A homemade three finger gouge scratch tester was used to simulate the scratch of a human finger across the surface of a solid ink print. A heavy load finger (528 g) and a medium load finger (264 g) were lowered on the print's surface and the scratcher was run to let the fingers scratch a straight line across a sample at a set speed. FIG. 3 shows the results for the three finger gouge scratch test comparing a recording medium that was not overcoated, a recording medium overcoated with commercially available overcoating composition 1407D and a recording medium overcoated with aqueous overcoat composition #27.

Coating A provided improved scratch resistance at both medium weight (264 g) and heavy weight (528 g) loading, as compared to an uncoated control. The scratch mark could barely be seen on the medium weight load and was narrowed in the heavy weight load, as compared to that observed for the sample having the 1407D overcoat (dry continuous film). All the tests on the same substrates: Brown Kraft and White Top Liner.

Example 5

Cross-Cut Tape Peel Test

This test followed the international standard ISO16726-2, Part 2: Cross-cut testing for evaluating the adhesion and cohesion of a coating. The test procedure is as follows:
1: Manually generate 5-7 X-cuts on the coated surface of the prints using a ruler and a "single-edge razor blade."
2: Setup the instrument with Xerox Standard Tape A1X.
3: Put the prints on top of the plastic backing sheet supplied with the LINTVIEW instrument (Labtech Instruments, Inc., Laval, Canada) and carefully line up the X-cut area on top.
4: Run the prints together with the plastic backing sheets through the LINTVIEW with short edge leading through.

Figure 4:
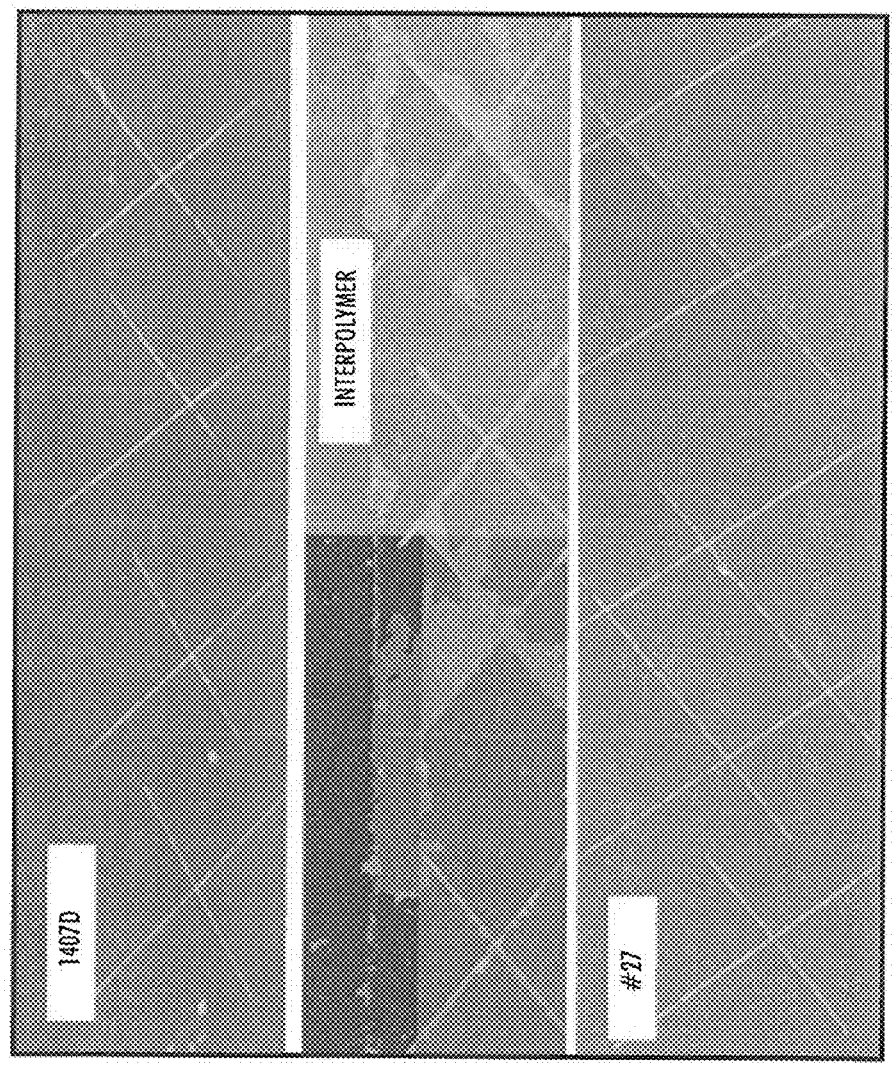
FIG. 4 depicts results of a cross-cut tape peel test comparing a recording medium that has not been overcoated, a recording medium overcoated with an overcoating composition (INTERPOLYMER, Inc.) and a recording medium of one embodiment.

The adhesion of aqueous overcoat on solid ink prints is poor for most commercially available coatings. FIG. 4 depicts results of a cross-cut tape peel test comparing a recording medium that was not been overcoated, a recording medium overcoated with a commercially available Interpolymer overcoating composition and a recording medium prepared with aqueous overcoating compositions #27. The print image which was coated by coating from Interpolymer Inc. over solid ink jet prints provided poor adhesion between the coating and the substrate. A number of small white dots were observed on the 1407D coating. Coating #27, falling within the scope of some embodiments, demonstrated the best performance.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "containing," "including," "includes, "having," "has," "with," or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected. Further, in the discussion and claims herein, the term "about" indicates that the value listed may be somewhat altered, as long as the alteration does not result in nonconformance of the process or structure to the illustrated embodiment.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g., −1, −1.2, −1.89, −2, −2.5, −3, −10, −20, and −30, etc.

It will be appreciated that variants of the above-disclosed and other features and functions, or alternatives thereof, may be combined into many other different systems or applications. Various presently unforeseen or unanticipated alternative, modifications, variations or improvements therein may be subsequently made by those skilled in the art which are also intended to be encompassed by the following claims.

What is claimed is:

1. A recording medium with a coated image thereon, wherein the coated image comprises:
 (a) a solid ink image on a substrate, and
 (b) an overcoat that at least partially covers the solid ink image,
  wherein the overcoat is prepared by a method comprising applying an aqueous overcoat composition to at least a part of the solid ink image and wherein the aqueous overcoat composition comprises at least one latex emulsion, a polyethylene wax in an amount ranging from about 20wt % and about 30 wt %, and at least one co-binder, wherein the co-binder comprises at least one resin, water, at least one anti-foaming agent and at least one amino alcohol.

2. A solid ink print comprising:

a solid ink image on a substrate; and a varnish composition at least partially covering the solid ink image, wherein the varnish composition before drying comprises at least one latex emulsion, a polyethylene wax in an amount ranging from about 20 wt % and about 30 wt %, at least one cobinder and, optionally, at least one surfactant, wherein the co-binder comprises at least one resin, water, at least one anti-foaming agent and at least one amino alcohol.

3. The solid ink print of claim 2, wherein the substrate comprises a material selected from the group consisting of uncoated paper, uncoated paperboard, coated paper, coated paperboard, synthetic paper and plastic films.

4. The solid ink print of claim 2, wherein the latex emulsion comprises polymer microparticles, an emulsifier, an aqueous medium, and, optionally between about 1 wt % to about 5 wt % at least one base, and the polymer microparticles comprise an acrylic polymer, a styrene/acrylic polymer, a polyester, or mixtures of two or more thereof.

5. The solid ink print of claim 2, wherein before drying the varnish composition comprises between about 45 wt % and about 90 wt % latex emulsion.

6. The solid ink print of claim 2, wherein before drying the varnish composition comprises.

7. The solid ink print of claim 2, wherein before drying the varnish composition has a viscosity from about 50 cP to about 1000 cP at approximately room temperature.

8. The solid ink print of claim 2, wherein the varnish composition is applied at a wet thickness of from about 1μm to about 20μm, and the dried film thickness has from about 0.5μm to about 10μm.

\* \* \* \* \*